United States Patent [19]

Hamada et al.

[11] 4,210,909
[45] Jul. 1, 1980

[54] COMPLETE BLEACHING OF NON-SELECTED DISPLAY ELECTRODES IN AN ELECTROCHROMIC DISPLAY DRIVE

[75] Inventors: Hiroshi Hamada; Hiroshi Take; Yasuhiko Inami, all of Tenri; Hisashi Uede, Yamatokoriyama, all of Japan

[73] Assignee: Sharp Kabushiki Kaisha, Osaka, Japan

[21] Appl. No.: 896,591

[22] Filed: Apr. 14, 1978

[30] Foreign Application Priority Data

Apr. 20, 1977 [JP] Japan .................................. 52/46097

[51] Int. Cl.² ............................ G09F 9/32; G06F 3/14
[52] U.S. Cl. ..................................... 340/763; 340/785; 340/811; 350/357
[58] Field of Search ....................... 340/785, 763, 765; 350/357

[56] References Cited

U.S. PATENT DOCUMENTS

| 3,443,859 | 5/1969  | Rogers          | 340/785 |
| 3,736,043 | 5/1973  | Sambucetti      | 340/785 |
| 3,938,131 | 2/1976  | VanDoorn et al. | 340/785 |
| 4,057,739 | 11/1977 | Otake           | 340/785 |

FOREIGN PATENT DOCUMENTS 2650732  5/1977  Fed. Rep. of Germany ........... 350/357

OTHER PUBLICATIONS

Features of an Electrochromic Display Device, R.D. Giglia, Amer. Cyanamid Co., 5/76.

Primary Examiner—Marshall M. Curtis
Attorney, Agent, or Firm—Birch, Stewart, Kolasch & Birch

[57] ABSTRACT

A driving system is provided for an electrochromic display device in which the coloration state is maintained for several hours through several days of the removal of the coloration voltage as long as the electrochromic display device is held in an electrically opened state. The coloration voltage is applied to a display electrode for a predetermined period of time in order to color the display electrode. When the display electrode is desired to be bleached, the bleaching voltage is continuously applied to the display electrode. That is, the application of the bleaching voltage is maintained for a period of time during which the display electrode is placed in the bleached state. The non-selected display electrodes (those not selected for coloration) are also continuously bleached until these non-selected display electrodes are selected for coloration.

13 Claims, 27 Drawing Figures

COMPLETE BLEACHING OF NON-SELECTED DISPLAY ELECTRODES IN AN ELECTROCHROMIC DISPLAY DRIVE

BACKGROUND OF THE INVENTION

The present invention relates to a driving system for an electrochromic display device which includes an electrochromic material held in two electrode carrying support plates to manifest reversible variations in the light absorption properties when current is supplied.

Generally, there are two types of electrochromic displays (ECD). The first type of ECD utilizes an electrically-induced chemical reduction of a colorless liquid to produce a colored, insoluble film on an electrode surface. The second type of ECD employs an inorganic solid film formed on electrodes, wherein the color variation is produced by the change in the opacity of the inorganic solid film.

The inorganic solid film used in the second type of ECD is the film of the transition metal oxide material such as tungsten oxide ($WO_3$). Such film cooperates with a liquid electrolyte. A typical system of the second type ECD is disclosed in B. W. Faughnan et al, RCA Review 36 177 (1975).

Various driving systems are proposed for the electrochromic displays. The electrochromic displays inherently possess the memory characteristics, which maintains the colored state for several hours through several days after the applied voltage is removed.

Therefore, it is important to effectively use the above-mentioned memory characteristics in order to minimize the power dissipation of the driver circuit. Moreover, the display electrode must be placed in the completely bleached state while the display electrode is not placed in the coloration memory state.

In the case where the electrochromic display device includes a predetermined number of display segments, each of the various combinations of the display segments defining a different one of desired display patterns, non-selected display segments must be placed in the completely bleached state while the selected display segments are placed in the coloration memory state in order to enhance the display quality.

OBJECTS AND SUMMARY OF THE INVENTION

Accordingly, an object of the present invention is to provide an improvement in a driving system for electrochromic displays which can enhance the legibility of a visual display provided by the electrochromic displays.

Another object of the present invention is to completely bleach the display electrode when the display electrode is not placed in the coloration memory state.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

The present inventors have discovered the following facts.

(1) When the coloration/bleaching cycle is repeated, the display electrode is slightly colored even when the display electrode is placed in the bleached state. This phenomenon is referred to as "incomplete erasure" hereinbelow.

(2) When the electrochromic display cell is exposed to visible rays or ultraviolet rays, the display electrode placed in the bleached state is gradually colored due to the photochromism phenomenon.

The above-mentioned two phenomena deteriorate legibility of a visual display provided by the electrochromic display.

To eliminate the above defects, pursuant to an embodiment of the present invention, the bleaching operation is continuously conducted to the display electrode which is desired to be placed in the bleached state. More specifically, when the electrochromic display device includes a plurality of display segments, the non-selected display segments are maintained to receive the bleaching voltage while the selected display segments are connected to receive the coloration voltage for a predetermined period of time and, thereafter, maintained at the coloration memory state without receiving any drive voltages.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENTS

Figure 1:
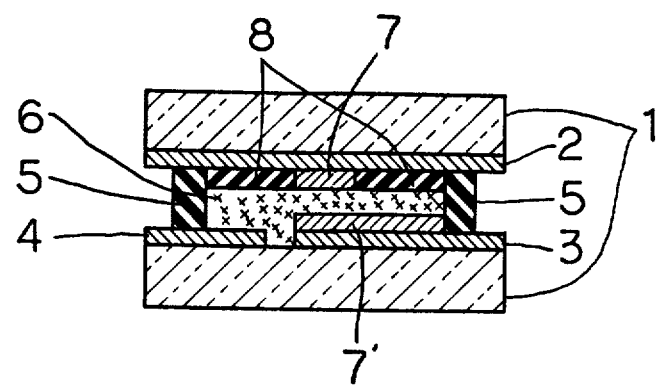
FIG. 1 is a cross-sectional view of a basic structure of an electrochromic display device suited for the driving system of the present invention.

FIG. 1 shows a basic structure of an electrochromic display device which includes an inorganic solid film formed on electrodes, and a liquid electrolyte.

Two transparent substrates 1 such as a glass substrate define the electrochromic display device. A transparent display electrode 2 is formed on one of the transparent substrates 1. A counter electrode 3 and a reference electrode 4 are formed on the other transparent substrate 1. A film of an electrochromic material 7 is formed on the transparent display electrode 2 in a desired configuration, and a film of an electrochromic material 7' is formed on the counter electrode 3. An insulator film 8 is formed on the display electrode 2 at positions where the film 7 is not formed. The thus formed two substrates 1 are fixed to each other with the intervention of a spacer 5, and a liquid electrolyte 6 is filled in the cell.

When an electric current flows through the cell from the counter electrode 3 to the display electrode 2, the display electrode 2 is colored. The coloration degree is substantially proportional to the amount of charges flowing through the cell. When the electric current flows in the counter direction, the display electrode 2 is bleached, or, the display electrode 2 is returned to the colorless state.

Transmittance $T(\lambda)$ of the display electrode 2 against a light beam of the wavelength $\lambda$ can be formulated as follows before the coloration is saturated.

$$-\log T(\lambda) = \epsilon(\lambda) \cdot \sigma$$

where:

$\sigma$ is the charge amount flowing through a unit area; and $\epsilon(\lambda)$ is a proportional constant inherently held by the electrochromic material against the light beam of the wavelength $\lambda$.

When the electrochromic material film is made of a $WO_3$ film, the proportional constant $\epsilon(\lambda)$ is as follows against the light beam of the wavelength 590 nm.

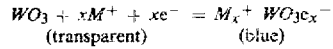

The coloration operation is considered as follows:

$$WO_3 + xM^+ + xe^- = M_x^+ WO_3 e_x^-$$
(transparent)      (blue)

where:

$M^+$ is $H^+$, $Li^+$, $Na^+$, $K^+$, etc.

The above-mentioned ECD has the following characteristic features, in general:

(1) the viewing angle is extremely wide;
(2) contrast is very high and is independent from the viewing angle;
(3) low voltage driver (below several volts);
(4) memory effects are expected, which maintain the coloration state for several hours through several days after the coloration voltage is removed as long as ECDs are held in an electrically opened state. Of course, the memory effects require no externally supplied power;
(5) the coloration degree is determined by the charge amount flowing through a cell; and
(6) energy consumption is proportional to the display size and the repetition number of the coloration-bleaching cycle.

The ECDs are suited for a display device of a portable electronic apparatus because they operate at a low voltage generated from a power cell.

Generally, there are three types of driving methods for ECD. That is, the ECD is driven by either one of the three driving methods, namely, the driver in a method either one of the constant potential type, the constant current type, and the constant voltage type.

(1) CONSTANT POTENTIAL DRIVE

Figure 2:
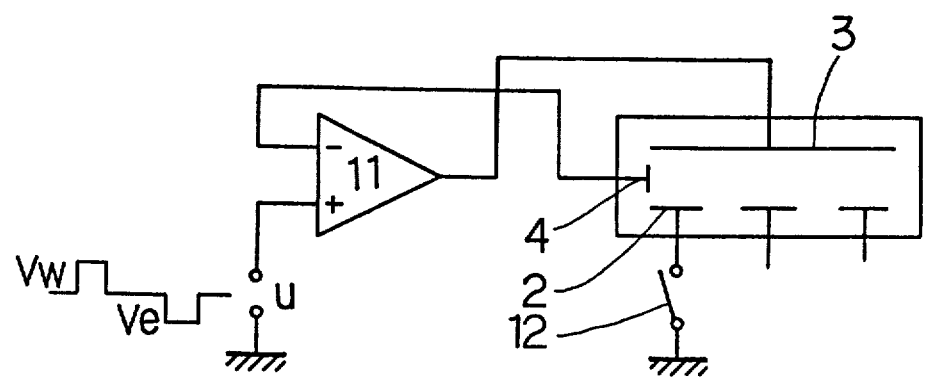
FIG. 2 is a circuit diagram of a typical driver circuit of the constant potential type for ECD.

FIG. 2 shows a typical driver circuit of the constant potential type. In the constant potential type, the voltage applied to the counter electrode 3 is controlled so that a voltage difference between the display electrode 2 and the reference electrode 4 is maintained at a predetermined value U. When the display electrode 2 is held at a potential lower than that of the reference electrode 4 by more than a threshold level $E_{th}$, the coloration operation is conducted. Contrarily, when the display electrode 2 is held at a potential higher than that of the reference electrode 4 by more than the threshold level $E_{th}$, the display electrode 2 is bleached.

In the driver circuit of FIG. 2, the display electrodes are selectively connected to the ground potential. Therefore, when the predetermined value U is selected at a positive value, the display electrode potential becomes lower than the reference electrode potential. The driver circuit of FIG. 2 includes a linear amplifier 11 and segment selection switches 12.

Although only one segment selection switch 12 is illustrated in FIG. 2, the segment selection switches 12 are provided for each of the segment electrode 2 in order to properly select the display electrodes or the segment electrodes.

Figure 3:
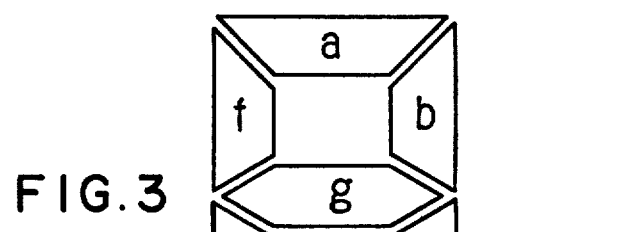
FIG. 3 is a layout of a typical seven-segment numeral display pattern.
Figure 4:
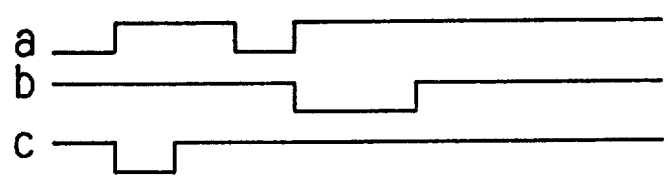
FIG. 4 is a schematic view showing display conditions of numerals 1 through 0.
Figure 5:
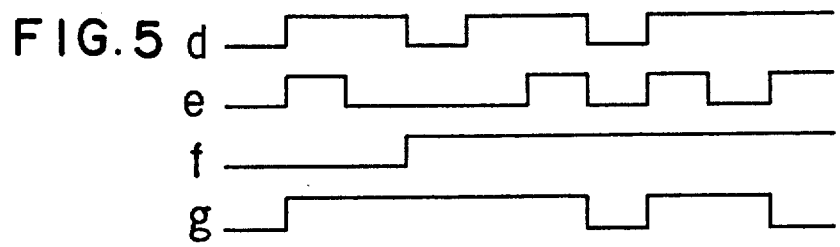
FIG. 5 is a time chart of selection signals applied to segment electrodes a through g of FIG. 3 to indicate the numerals of FIG. 4.

FIG. 3 shows a layout of a typical seven-segment numeral display pattern, FIG. 4 shows display conditions of numerals 1 through 0, and FIG. 5 shows signal waveforms applied to the respective display electrodes of FIG. 3.

Figure 6:
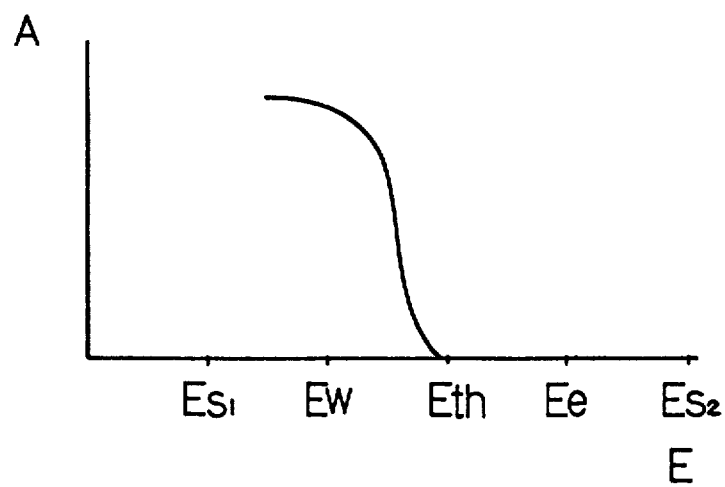
FIG. 6 is a graph showing light absorption versus electrode potential characteristics of a display segment electrode employed in the electrochromic display device of FIG. 1.

FIG. 6 shows the relationship between the potential E of the display electrode 2 and the light absorption properties A (= −log (transmittance)) of the display electrode 2 in the state of equilibrium.

In the actual system, the magnitude of the coloration voltage and the bleaching voltage is selected to be greater than the potential of the equilibrium state to speed up the coloration and bleaching operations. And the segment selection switches 12 are turned OFF at a desired time at which the coloration or bleaching operation is conducted to a desired degree. Thereafter, the colored segment electrodes are held in the memory state. In this driver system, the coloration operation effected to a specific segment electrode and the bleaching operation effected to another segment electrode can not be conducted at a same time.

When the coloration potential $E_W$ and the bleaching potential $E_e$ are selected at values within the range which will not produce any side reactions, decomposition of the liquid electrolyte and deterioration of the electrochromic material and the electrode can be prevented. That is, when the limit values for the side reactions are $E_{s1}$ and $E_{s2}$, the coloration potential $E_w$ and the bleaching potential $E_e$ should be selected to satisfy the following relationships.

$$E_{s1} < E_w, \quad E_e < E_{s2}$$

In addition, the reaction at the counter electrode 3 must be properly controlled in order to prevent the decomposition of the liquid electrolyte and the deterioration of the counter electrode 3. This control can be easily conducted by lowering the source voltage of the linear amplifier 11. The above-mentioned driver system requires an analog circuit which ensures the stable operation at a considerably large current (several tens millamperes per display area/cm$^2$). The segment selection switches 12 can comprise semiconductor switches.

(2) CONSTANT CURRENT DRIVE

Figure 7:
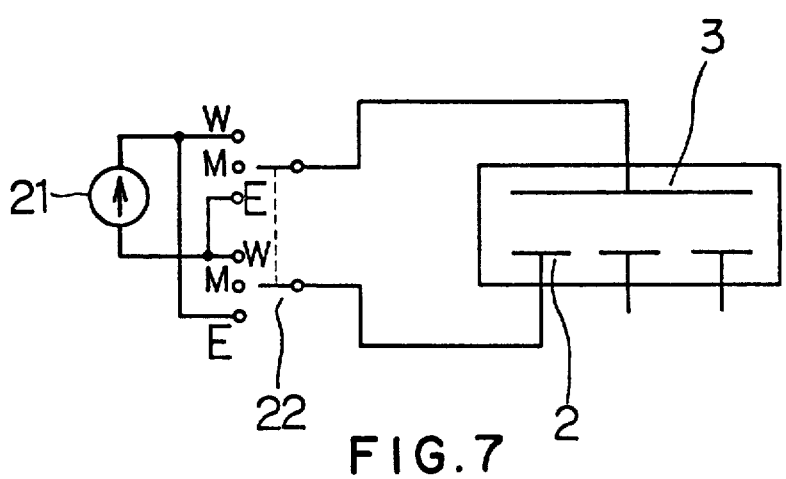
FIG. 7 is a circuit diagram of a typical driver circuit of the constant current type for ECD.

FIG. 7 shows a typical driver circuit of the constant current type, which mainly comprises a constant current source 21. A selection switch 22 is provided for each of the segment electrodes 2 to conduct the coloration and bleaching operations and to place the segment electrodes 2 in the memory state. The terminals W are for the coloration operation, the terminals E are for the bleaching operation, and the terminals M are for the memory function.

The constant current drive has the advantage that the coloration degree can be set at a desired value. Moreover, the coloration of a specific segment and the bleaching of another segment can be conducted at a same time when the constant current sources are separately provided for the respective segment electrodes.

An example of the drive system of the above-mentioned constant current drive is disclosed in copending application, CONSTANT CURRENT SUPPLY DRIVE FOR ELECTROCHROMIC DISPLAYS OF THE SEGMENTED TYPE, Ser. No. 800,008, filed on May 24, 1977 by Yasuhiko Inami, Tadanori Hishida, Kozo Yano, Hiroshi Hamada and Hiroshi Nakauchi and assigned to the same assignee as the present application.

Figure 8:
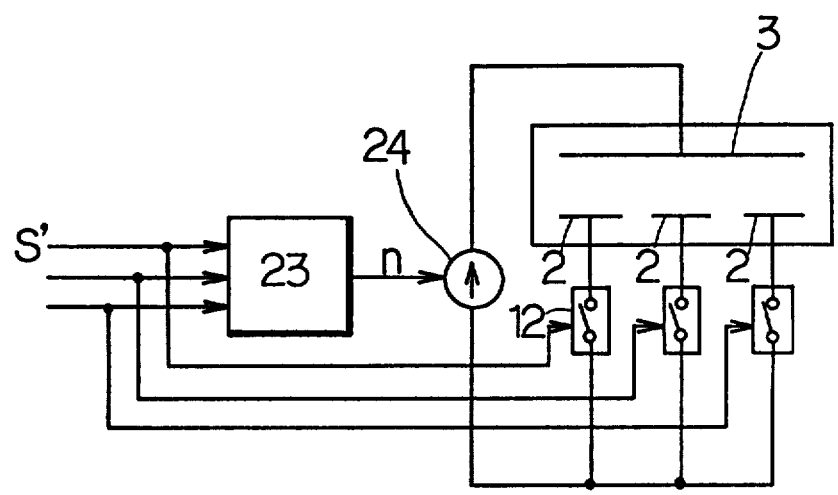
FIG. 8 is a circuit diagram of another example of a driver circuit of the constant current type for ECD.

FIG. 8 shows another example of a driver circuit of the constant current type, which mainly comprises a constant current source 24 of which an output current varies in response to a segment number signal n. The driver circuit of FIG. 8 further comprises the segment selection switches 12, and a counter 23 for counting the number of segment electrodes to be drivern in response to segment signals S'.

An example of the drive system of the above-mentioned constant current drive is disclosed in copending application, CURRENT CONTROLLED DRIVE SYSTEM FOR ELECTROCHROMIC DISPLAYS OF THE SEGMENTED TYPE, Ser. No. 800,009, filed May 24, 1977 by Yasuhiko Inami, Sadatoshi Takechi, Tadanori Hishida, Hisashi Uede and Hiroshi Nakauchi and assigned to the same assignee as the present application.

The charge amount flowing during the coloration operation and the bleaching operation must be strictly set at the same value to ensure the stable operation. If the charge amount flowing during the coloration operation is larger than that flowing during the bleaching operation, the charges are accumulated during the repetition of the coloration/bleaching operations, and the thus accumulated charges produce an undesirable coloration even when the display segment is placed in the bleached condition.

Contrarily, when the charge amount flowing during the bleaching operation is greater than that flowing during the coloration operation, undesirable side reactions such as the decomposition of the liquid electrolyte and the deterioration of the display electrode will occur. Such side reactions can be prevented by controlling the variation range of the voltage level of the constant current source.

Figure 9:
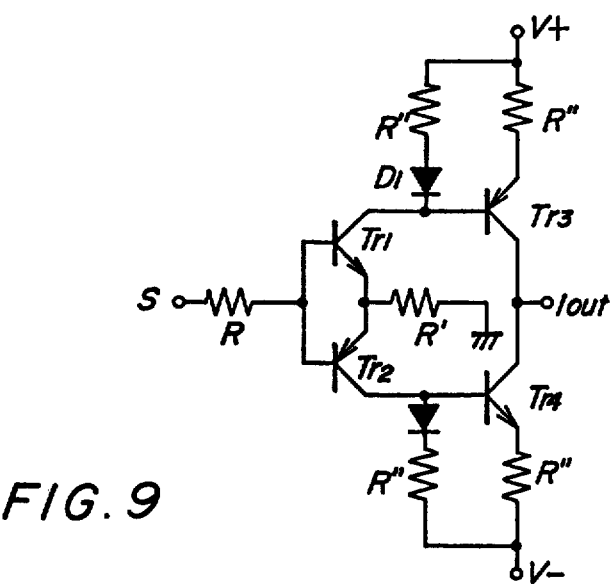
FIG. 9 is a circuit diagram of an example of a constant current source employed in the driver circuit of FIG. 7.
Figure 10:
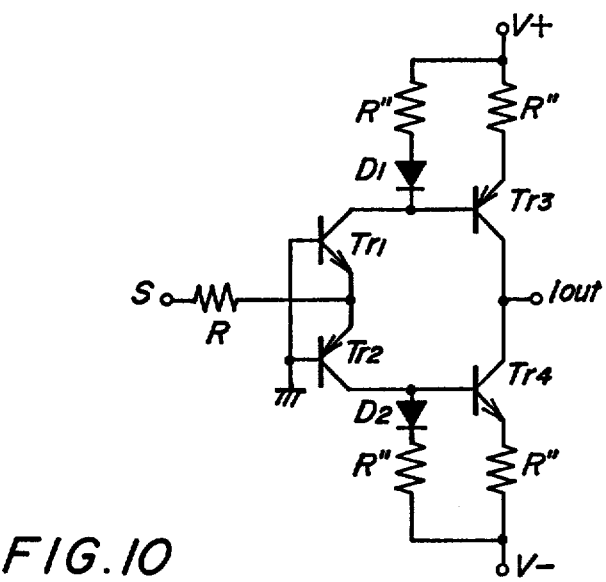
FIG. 10 is a circuit diagram of another example of a constant current source employed in the driver circuit of FIG. 7.

FIGS. 9 and 10 show examples of the constant current source 21 employed in the constant current driver circuit of FIG. 7.

In the circuit of FIG. 9, a current is developed from an output terminal $I_{out}$, the amount of the current being proportional to the electric current introduced from a control terminal S. In the circuit of FIG. 10, a current is led in through an output terminal $I_{out}$, the amount of the current being proportional to the electric current introduced from a control terminal S. When any current is not applied to the control terminal S, the output terminal $I_{out}$ is held at the high impedance and, therefore, the corresponding segment is held in the memory state.

In the circuits of FIGS. 9 and 10, resistors R' and R", and diodes $D_1$ and $D_2$ are provided for reducing the variations of the current amplification factor.

(3) CONSTANT VOLTAGE DRIVE

Figure 11:
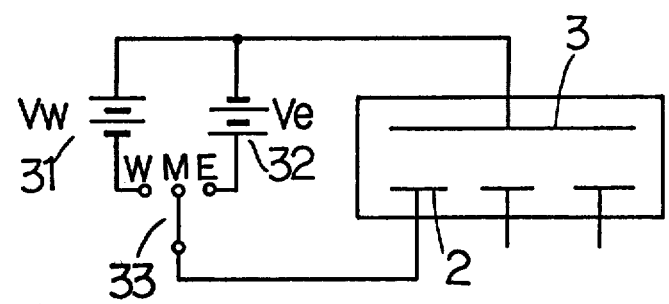
FIG. 11 is a circuit diagram of a typical driver circuit of the constant voltage type for ECD.

FIG. 11 shows a typical driver circuit of the constant voltage type, which mainly comprises a coloration constant voltage source 31, a bleaching constant voltage source 32, and a selection switch 33. It is not necessarily required that the coloration voltage $V_w$ and the bleaching voltage $V_e$ have the same level.

Figure 12:
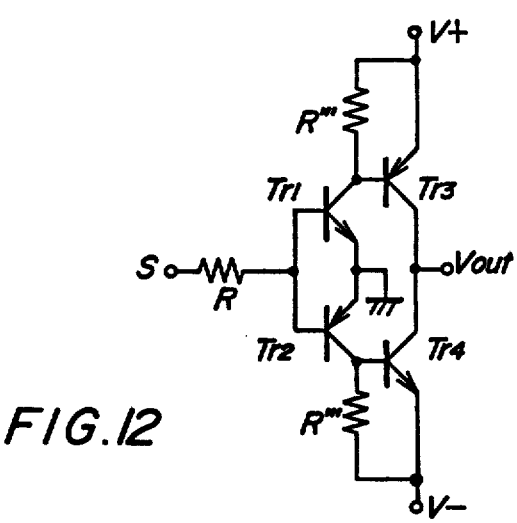
FIG. 12 is a circuit diagram of an example of a switching circuit employed in the driver circuit of FIG. 11.
Figure 13:
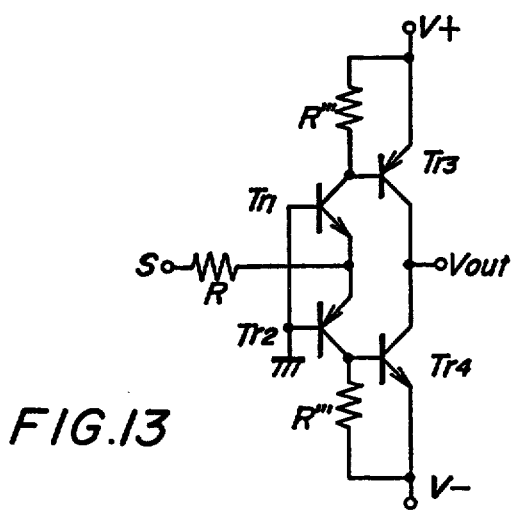
FIG. 13 is a circuit diagram of another example of a switching circuit employed in the driver circuit of FIG. 11.

FIGS. 12 and 13 show examples a selection switching circuit employed in the driver circuit of FIG. 11. The selection switching circuit of FIGS. 12 and 13 functions as the selection switch 33.

The output voltage polarity developed from an output terminal $V_{out}$ is changed in accordance with the polarity of a selection control signal applied to a selection control terminal S.

In the selection switching circuit of FIG. 12, the output voltage polarity is identical with that of the selection control signal. In the selection switching circuit of FIG. 13, the output voltage polarity is opposite to that of the selection control signal. When the selection control signal bears a zero volts, the output terminal $V_{out}$ is held at a high impedance. Transistors Tr$_3$ and Tr$_4$ operate in the saturated region.

Figure 14:
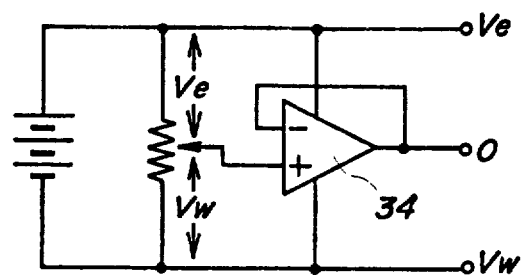
FIG. 14 is a circuit diagram of an example of a constant voltage source for the driver circuit of the constant voltage type.

FIG. 14 shows an example of the constant voltage source, wherein the coloration voltage V$_w$ and the bleaching voltage V$_e$ are derived from one power source. The constant voltage source of FIG. 14 is suited for the simultaneous coloration/bleaching technique, since the circuit of FIG. 14 minimizes the power dissipation in the simultaneous coloration/bleaching technique. The circuit of FIG. 14 mainly comprises a linear amplifier 34.

The constant voltage drive technique is superior to the remaining two drive techniques, since the circuit construction is simple and the power dissipation is minimized.

As already discussed above, in the electrochromic display device employing the transition metal oxide film such as a WO$_3$ film and a MoO$_3$ film, the present inventors have discovered the photochromism phenomenon, wherein the display electrode placed in the bleached state is gradually colored when the electrochromic display cell is exposed to visible rays or ultraviolet rays. For example, when the electrochromic display cell having a 2 mm thick soda lime glass substrate is exposed to sun beams for one hour, the coloration of the bleached display electrode is apparently recognized.

Figure 15:
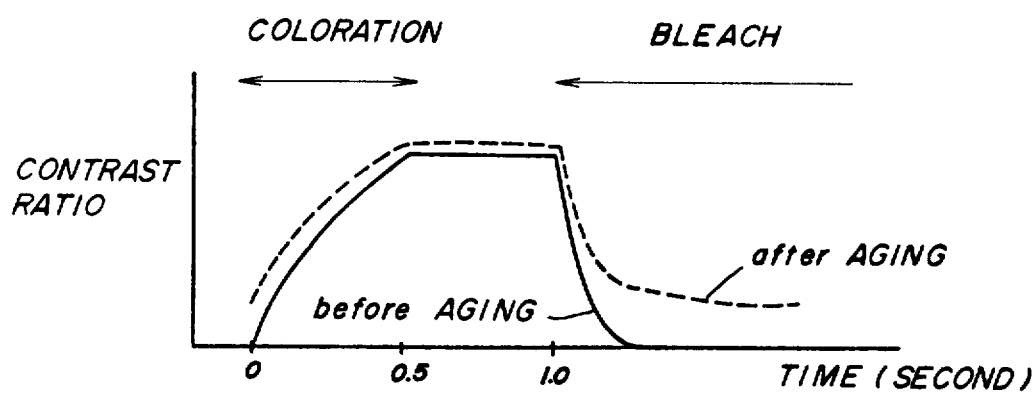
FIG. 15 is a graph showing the incomplete erasure phenomenon due to aging.

Moreover, when the coloration/bleaching cycle is repeated, the incomplete erasure phenomenon is observed, wherein the display electrode is slightly colored even when the display electrode is electrically placed in the bleached state. FIG. 15 shows the incomplete erasure phenomenon due to aging. More specifically, FIG. 15 shows the relationship between the time (along the abscissa axis) and the contrast ratio (along the ordinate axis) of the display electrode employed in the electrochromic display device. The solid line shows the condition before the again test is conducted, and the broken line shows the condition after the aging test is conducted.

The present invention is to minimize the above-mentioned defects.

The electrochromic display cell of the FIG. 1 construction is fabricated in the following way.

The transparent substrates 1 are made of soda lime glass. An In$_2$O$_3$ layer is formed on one of the glass substrate 1 to provide the display electrode 2. The In$_2$O$_3$ layer is formed to 2000 Å thick through the use of the electron beam evaporation technique. Another In$_2$O$_3$ layer is formed on the other glass substrate 1 to 2000 Å thick through the use of the electron beam evaporation technique, the thus formed In$_2$O$_3$ layer functioning as the counter electrode 3 and the reference electrode 4. The sheet resistance value of the thus formed display electrode 2, the counter electrode 3 and the reference electrode 4 is 20Ω/sq.

Thereafter, the films 7 and 7' are formed on the display electrode 2 and the counter electrode 3, respectively, through the use of a thermal evaporation method. The films 7 and 7' are formed of a WO$_3$ film of 5000 Å thick. The evaporation condition is as follows:

| | |
|---|---|
| substrate temperature | 350° C. |
| evaporation rate | 10 Å/sec. |
| pressure | 5 × 10$^{-4}$ Torr (O$_2$ leak) |

The WO$_3$ film is formed on substantially the entire surface of the counter electrode 3 and on the display area of the display electrode 2 through the use of the mask evaporation method.

Thereafter, the display electrode 2 (In$_2$O$_3$ layer) is divided into segments through the use of a photoetching method employing the etchants comprising FeCl$_3$ and HCl. Lead electrode portions of the display electrode 2 are coated with the insulator film 8 made of silicon resin through the use of a screen printing method.

The thus formed two glass substrates 1 are fixed to each other with the intervention of a spacer 5 made of glass bars of 1 mm square. The liquid electrolyte 6 comprising "Cellosolve acetate" (CH$_3$COOC$_2$H$_4$OC$_2$H$_5$) manufactured by U.C.C. company solved with LiClO$_4$ by 1.0 mol/1 is filled within the cell. The liquid electrolyte 6 is mixed with BaSO$_4$ by 1 : 1 weight ratio to provide a white background.

As already discussed above, it is a great advantage that the electrochromic display inherently possesses the memory characteristics. However, it is important that every segment electrode should be colored to a uniform level in order to enhance the visibility. For example, when the coloration operation is conducted to a display electrode which has been placed in the coloration memory state, the coloration is superimposed on the previous coloration state of the display electrode and, therefore, the coloration degree becomes higher than that of the display electrode which has been placed in the bleached state and then the coloration operation is conducted to.

In order to avoid the above defects, two methods are proposed.

(A) ENTIRE ERASE TECHNIQUE

In all of the erase technique, the entire display segments are bleached simultaneously after completion of one pattern display and, then, the coloration operation is conducted to only desired display segments. A typical system for conducting the entire erase technique was disclosed in U.S. Pat. No. 3,950,936 entitled "DEVICE FOR PROVIDING AN ELECTRO-OPTICAL DISPLAY OF TIME" on Apr. 20, 1976.

(B) PARTIAL ERASE TECHNIQUE

In this technique, in transition of a visual display from a specific display pattern to another, the voltage signal is applied only to one or more display segments which are not common to the two display patterns, while no voltage signal is applied to the remaining display segments which are common to the two display patterns.

Now assume that the numeral information is displayed through the use of the seven segments a through g shown in FIG. 3, and a visual display is desired to be changed from the numeral "2" to "3". It will be obvious from FIGS. 3 through 5 that the segments a, b, d, e and g should be ON in order to display "2" while the segments a, b, c, d and g should be ON in order to display "3". In other words, the four segments a, b, d and g are common to "2" and "3". The segment e should be bleached and the segment c should be colored. That is, the number of segments to be driven is greatly reduced and, therefore, the power dissipation is greatly reduced.

The above-mentioned partial erase technique is described in detail in copending application, DRIVING TECHNIQUE FOR ELECTROCHROMIC DISPLAYS OF THE SEGMENTED TYPE, Ser. No. 751,819, filed Dec. 17, 1976 by Hisashi Uede, Yasuhiko Inami, Hiroshi Hamada, Tadanori Hishida and Hiroshi Nakauchi and assigned to the same assignee as the present application.

The present invention can be combined with the above-mentioned driving methods (1) through (3) and the driving techniques (A) and (B).

The drive system of the present invention will be discussed with reference to FIGS. 16 through 27.

(1) CONSTANT POTENTIAL/ENTIRE ERASE DRIVE

Figure 16:
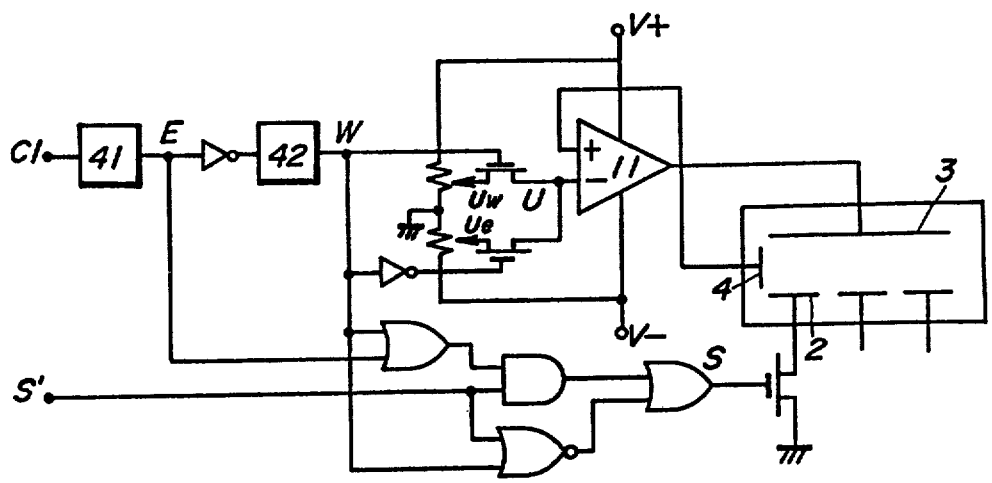
FIG. 16 is a block diagram of an embodiment of a driver circuit of the present invention related to the constant potential/entire erase type.
Figure 17:
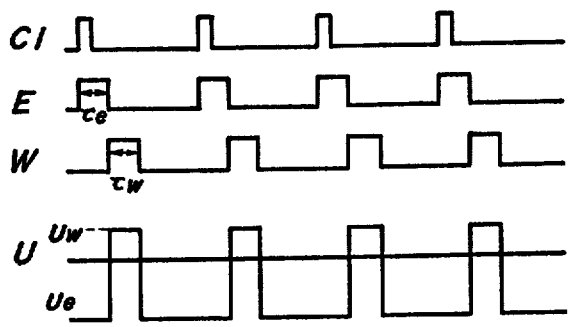
FIG. 17 is a time chart showing various signals occurring within the driver circuit of FIG. 16.
Figure 17:

FIGS. 16 and 17 show an embodiment of a driver circuit of the constant potential/entire erase type.

As already discussed above, in this drive system, the coloration operation and the bleaching operation can not be conducted at a same time. The bleaching operation is conducted at a first interval of time $\tau_e$ of each cycle, and the coloration operation is conducted at a second interval of time $\tau_w$ of each cycle. Thereafter, the colored segments are placed in the coloration memory state during the remaining period of time of each cycle, and the bleached segments are connected to continuously receive the bleaching drive signal during the remaining period of time of each cycle.

More specifically, when a clock signal C1 is developed, a one-shot multivibrator 41 develops an erase pulse E having a pulse width $\tau_e$. Another one-shot multivibrator 42 develops a write-in pulse W of a pulse width $\tau_w$ in response to the trailing edge of the erase pulse E. The thus developed write-in pulse W is level converted to provide a drive potential signal U, which takes a level $U_w$ at the coloration operation and a level $U_e$ at the bleaching operation.

A segment selection signal S', which takes the high level when the segment should be selected, and takes the low level when the segment is not selected, is combined with the write-in pulse W and the erase pulse E to provide a segment control signal S in the following manner.

$$S = S' \cdot (E + W) + (\overline{S' + W})$$

The thus obtained segment control signal S is applied to a switch associated with the each segment in order to conduct the coloration operation to a desired segment, to conduct the bleaching operation to a desired segment, and to maintain a desired segment in the memory coloration state. In the time chart of FIG. 17, I represents the current flowing through the ECD cell, and C.R. represents the contrast ratio between the coloration state and the bleached state.

(2) CONSTANT POTENTIAL/PARTIAL ERASE DRIVE

Figure 18:
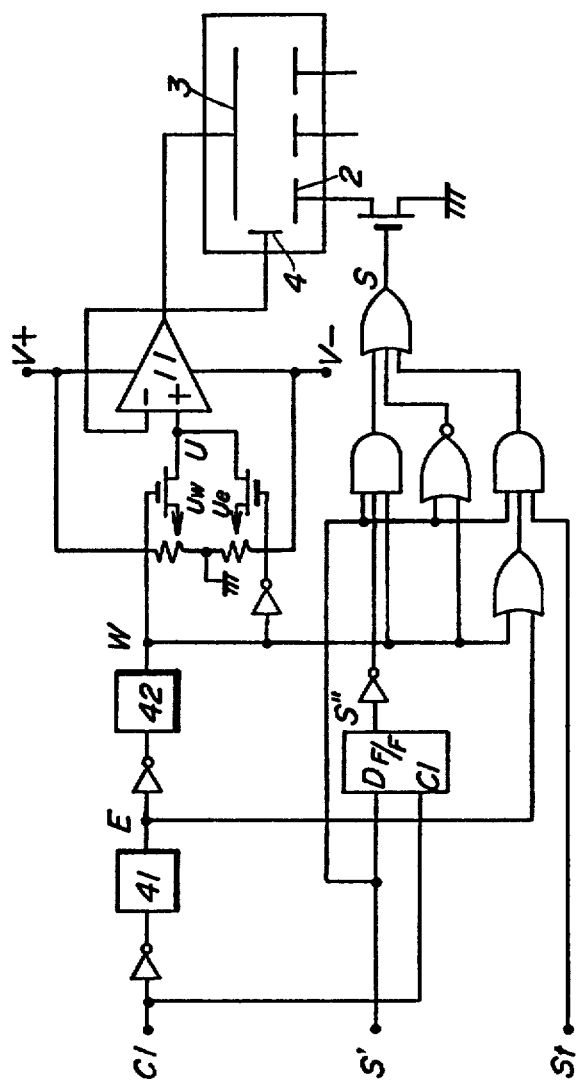
FIG. 18 is a block diagram of another embodiment of a driver circuit of the present invention related to the constant potential/partial erase type.
Figure 19:
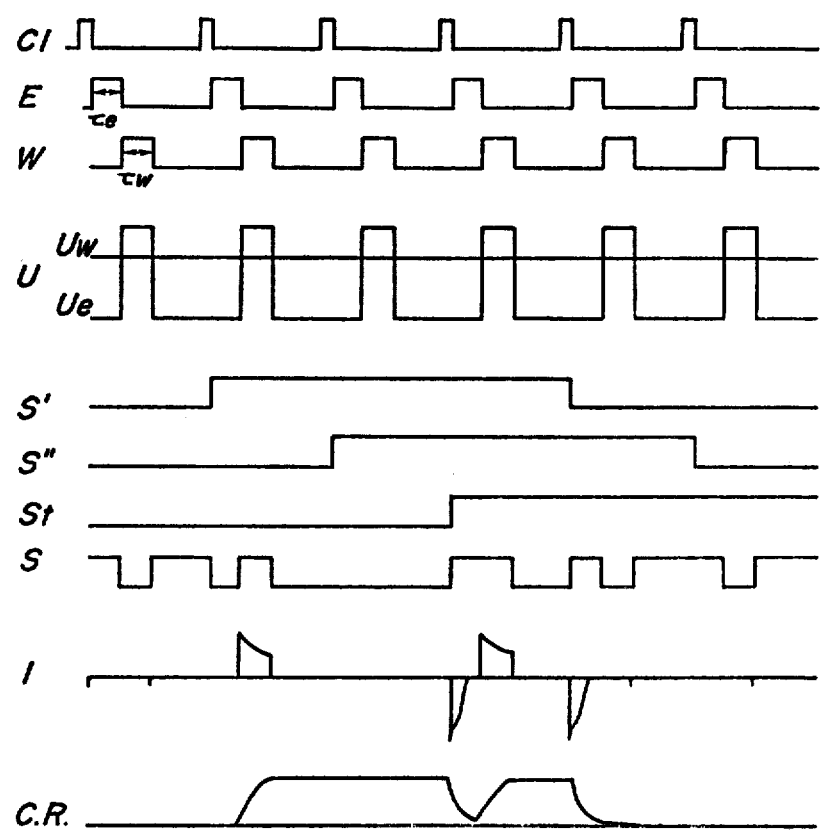
FIG. 19 is a time chart showing various signals occurring within the driver circuit of FIG. 18.

FIGS. 18 and 19 show an embodiment of a driver circuit of the constant potential/partial erase type combined with a strobe technique.

A data flip-flop F/F develops a delayed segment signal S" which corresponds to the segment selection signal S' of the previous cycle. The thus developed delayed segment signal S" is compared with the present segment selection signal S' in order to connect the segment 2 to receive the coloration voltage signal only when the segment selection signal S' is changed from the logic "low" to the logic "high". Accordingly, the segment control signal S can be expressed as follows:

$$S = \overline{S''} \cdot S' \cdot W + (\overline{S' + W})$$

A strobe signal St is developed at a desired time to regenerate the memory condition. When the strobe signal St is developed the all of the segments are at once bleached and the coloration operation is again conducted to desired segments.

The above-mentioned strobe technique is discussed in detail in copending application, REGENERATION OF A MEMORY STATE IN ELECTROCHROMIC DISPLAYS, Ser. No. 817,540, filed on July 20, 1977 by Hisashi Uede, Yasuhiko Inami, Hiroshi Kuwagaki, Hiroshi Hamada, Tadanori Hishida and Hiroshi Nakauchi and assigned to the same assignee as the present application.

When the above-mentioned strobe technique is combined with the constant potential/partial erase driving method, the segment control signal S can be expressed as follows, while the write-in pulse W and the erase pulse E are the same as in the case of the aforementioned constant potential/entire erase drive.

$$S = \overline{S''} \cdot S' \cdot W + (\overline{S' + W}) + St \cdot S' \cdot (W + E)$$

To ensure stable operation, the segment selection signal S', and the write-in pulse W or the erase pulse E are developed in response to the trailing edge of the clock pulse C1. Moreover, the strobe signal St must be controlled so that the strobe signal St will not change its logic value during a time period at which the write-in pulse W or the erase pulse E is developed.

(3) CONSTANT CURRENT DRIVE OR CONSTANT VOLTAGE DRIVE

The constant current drive and the constant voltage drive are similar to each other since the two methods employ the same segment control signal. Only difference is that the constant current drive employs the constant current source and the constant voltage drive employs the constant voltage source. Therefore, these two drive methods will be discussed in conjunction with each other.

However, when the bleaching operation is conducted through the use of the constant current drive method, one must specifically note that undesirable side reactions will occur. More specifically, when the charge amount flowing during the bleaching operation is greater than that flowing during the coloration operation, undesirable side reactions such as the decomposition of the liquid electrolyte and the deterioration of the display electrode will occur. Such side reactions can be prevented by controlling the variation range of the voltage level of the constant current source for the bleaching operation. For example, the source voltage V+ or V− shown in FIGS. 9 and 10 is properly selected so that the drive is changed from the constant current type to the constant voltage type once the output voltage reaches the selected voltage level.

Figure 20:
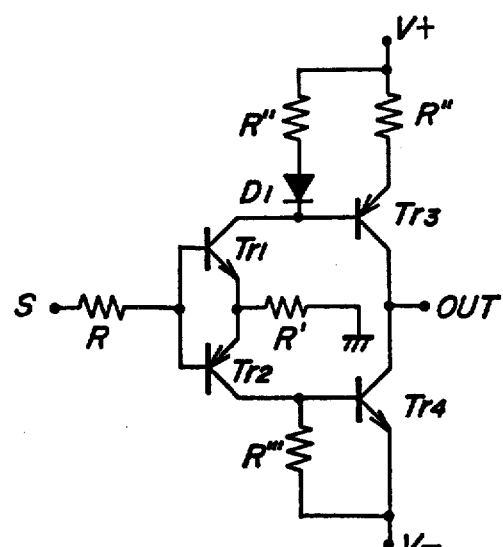
FIG. 20 is a circuit diagram of an example of a constant current coloration/constant voltage bleaching drive source suited for the drive system of the present invention.
Figure 21:
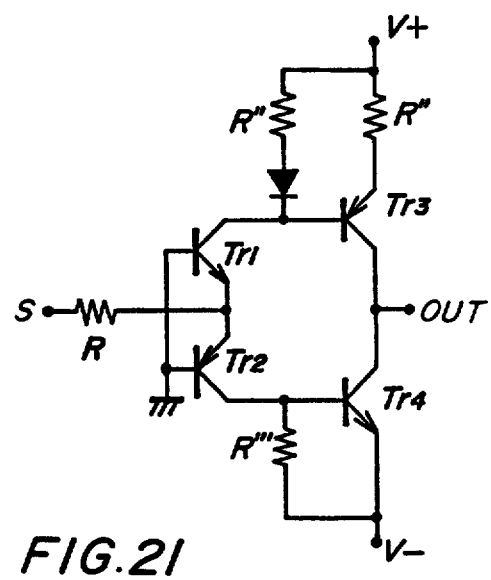
FIG. 21 is a circuit diagram of another example of a constant current coloration/constant voltage bleaching drive source suited for the drive system of the present invention.

Moreover, the constant current drive and the constant voltage drive can be combined with each other in such a manner that the coloration operation is conducted by the constant current method and the bleaching operation is conducted by the constant voltage method. In this combination, the coloration degree is properly controlled and the bleaching operation is completed in a short period of time. FIGS. 20 and 21 show examples of a switching circuit for conducting the above-mentioned combined constant current coloration/constant voltage bleaching drive. In FIGS. 20 and 21, the negative voltage source functions as the constant voltage source.

(3-1) CONSTANT CURRENT/ENTIRE ERASE DRIVE OR CONSTANT VOLTAGE/ENTIRE ERASE DRIVE

Figure 22:
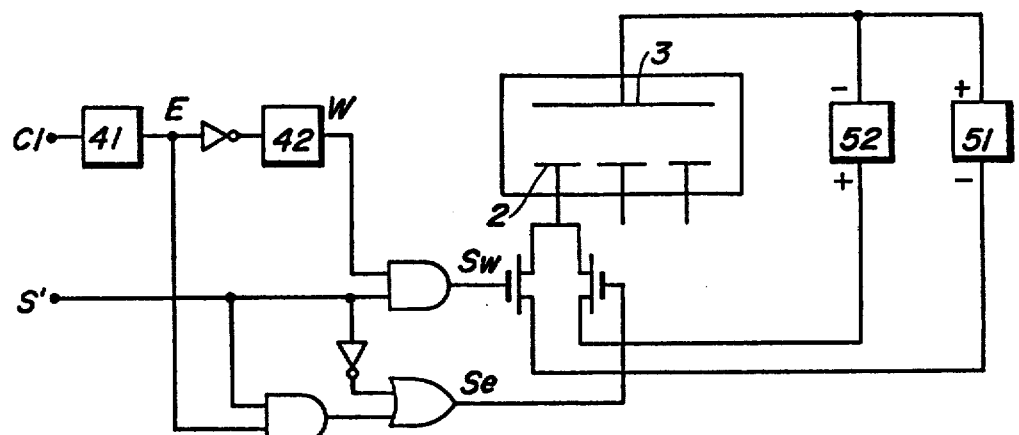
FIG. 22 is a block diagram of still another embodiment of a driver circuit of the present invention related to the constant voltage/entire erase type.
Figure 23:
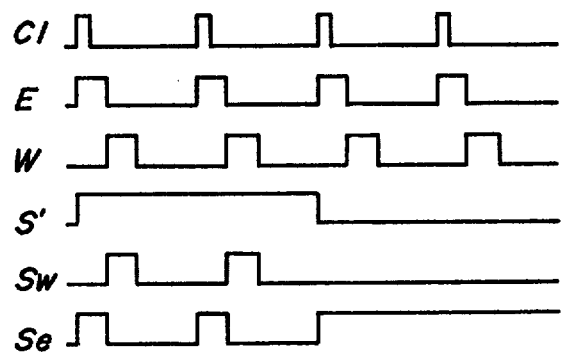
FIG. 23 is a time chart showing various signals occurring within the driver circuit of FIG. 22.
Figure 23:
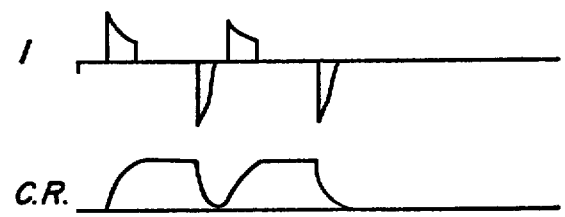

FIGS. 22 and 23 show an embodiment of a driver circuit of the constant voltage/entire erase type, which mainly comprises constant voltage sources 51 and 52.

The write-in pulse W and the erase pulse E are developed from the one-shot multivibrators 42 and 41, respectively, as in the case of the driver circuit of FIGS. 16 and 17. A coloration control segment signal $S_w$ and a bleaching control segment signal $S_e$ of the following logic are developed in response to the write-in pulse W, the erase pulse E and the segment selection signal S'.

$$S_w = S' \cdot W$$

$$S_e = \overline{S'} + S' \cdot E$$

When the coloration control segment signal $S_w$ bears the high level, the segment electrode 2 is connected to the coloration constant voltage source 51. When the bleaching control segment signal $S_e$ bears the high level, the segment electrode 2 is connected to the bleaching constant voltage source 52. The selected segment is placed in the coloration memory state until the following clock pulse E is developed. The non-selected segment is connected to continuously receive the voltage from the bleaching constant voltage source 52.

In the case where the constant current drive is desired to be performed, the constant current source such as disclosed in FIG. 8 is substituted for the constant voltage sources 51 and 52. In addition, in the case where the switching circuit such as disclosed in FIGS. 9, 10, 12, 13, 20 and 21 is provided for the respective segments, positive and negative polarity signals must be formed through the use of the coloration control segment signal $S_w$ and the bleaching control segment signal Se.

(3-2) CONSTANT CURRENT/PARTIAL ERASE DRIVE OR CONSTANT VOLTAGE/PARTIAL ERASE DRIVE

Figure 24:
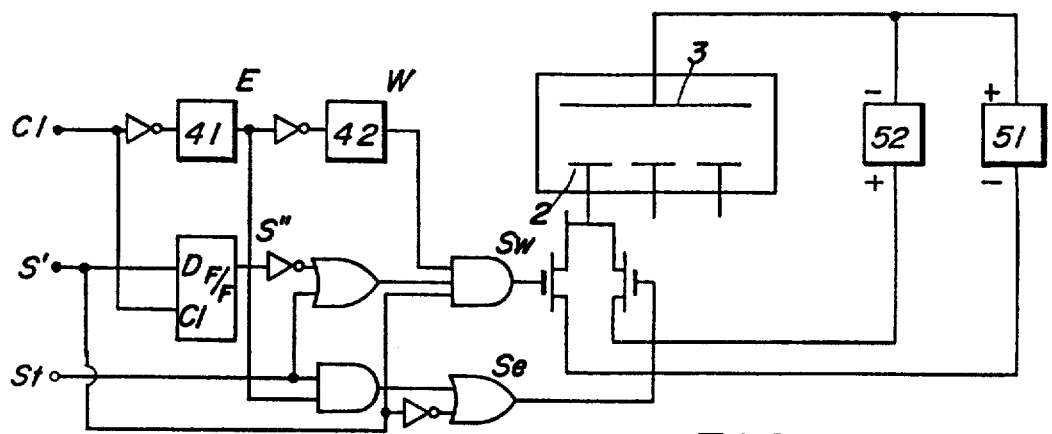
FIG. 24 is a block diagram of yet another embodiment of a driver circuit of the present invention related to the constant voltage/partial erase type.
Figure 25:
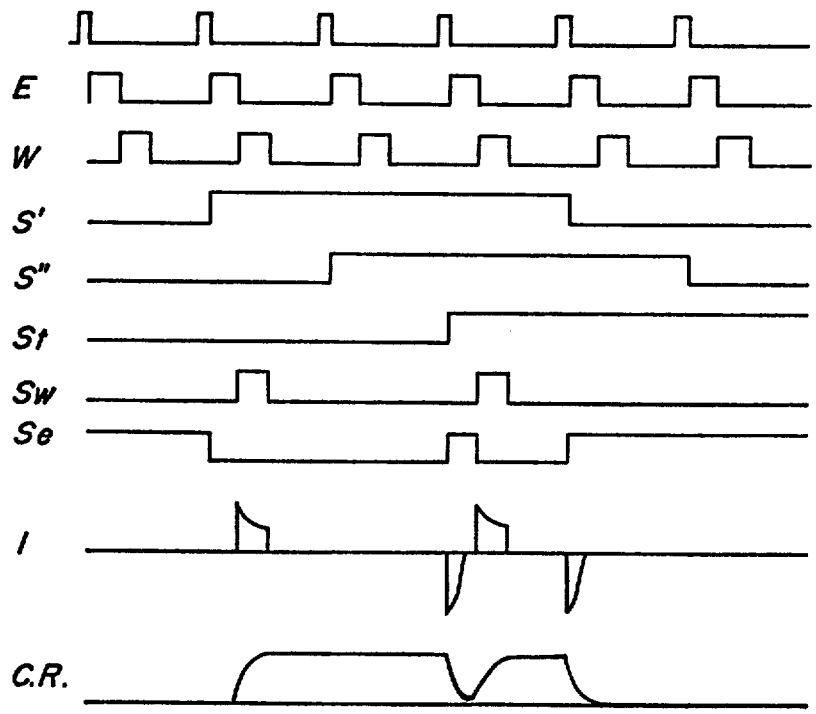
FIG. 25 is a time chart showing various signals occurring within the driver circuit of FIG. 24.

FIGS. 24 and 25 show an embodiment of a driver circuit of the constant voltage/partial erase type, which mainly comprises the constant voltage sources 51 and 52.

The constant current source should be substituted for the constant voltage sources 51 and 52 in case where the constant current drive is desired to be performed, as in the case of the driver circuit of FIGS. 22 and 23.

The coloration control segment signal $S_w$ and the bleaching control segment signal $S_e$ can be represented as follows:

$$S_w = (\overline{S''} + St) \cdot S' \cdot W$$

$$S_e = \overline{S'} + St \cdot E$$

where:

S'' is the delayed segment signal corresponding to the segment selection signal S' of the previous cycle;

St is the strobe signal for regenerating the memory state;

W is the write-in pulse; and E is the erase pulse.

When the system does not employ the strobe technique, the erase pulse E is not necessarily required. In the driver circuit of FIGS. 24 and 25, when the strobe signal St is not developed, the non-selected segment is continuously connected to receive the bleaching voltage from the constant source 52. When the segment selection signal S' is changed from the logic "low" to the logic "high", the segment is connected to receive the coloration voltage from the constant voltage source 51 for a period of time determined by the write-in pulse W and, thereafter, placed in the coloration memory state. When the strobe signal St is developed, the selected segment is once bleached and, then, the coloration operation is conducted thereto.

In the driver circuits of FIGS. 18, 19, 24 and 25, the coloration operation is conducted with a time delay of $\tau_e$ when the segment selection signal S' is changed from the logic "low" to the logic "high". To eliminate the above-mentioned time delay, the write-in pulse W and the erase pulse E can be developed from a control circuit shown in FIGS. 26 and 27, which comprises one-shot multivibrators 41 and 42.

Figure 26:
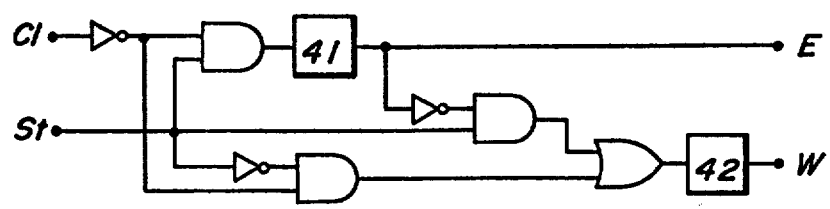
FIG. 26 is a block diagram of a circuit for generating a write pulse and an erase pulse combined with a strobe signal.
Figure 27:
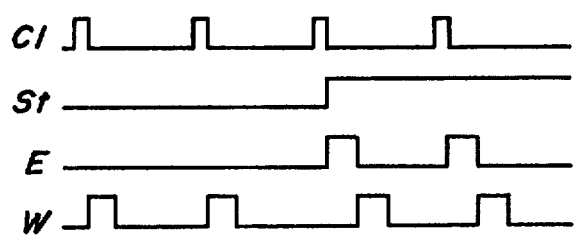
FIG. 27 is a time chart for explaining operation of the circuit of FIG. 26.

By employing the control circuit of FIGS. 26 and 27, the erase pulse E is not developed when the strobe signal St takes the logic "low", and the write-in pulse W is developed in response to the trailing edge of the clock pulse Cl. Only when the strobe signal St takes the logic "high", the erase signal E is developed in response to the trailing edge of the clock pulse Cl, and the write-in pulse W is developed in response to the trailing edge of the erase pulse E.

Preferred drive conditions are as follows:

(A) CONSTANT POTENTIAL DRIVE

| write-in potential | $U_w = 1.0V$ |
|---|---|
| write-in period | $\tau_w = 500$ msec. |
| erase potential | $U_e = -1.5V$ |

Under these conditions, the charges more than 5 mC/cm$^2$ flow through the cell during the coloration operation, and the contrast ratio is greater than 3:1 against the wavelength 590 nm. The bleaching operation is completed by 200–300 msec. However, the bleaching potential is continuously applied to the cell.

(B) CONSTANT CURRENT DRIVE

| write-in current | $I_w = 10$ mA/cm$^2$ |
|---|---|
| write-in period | $\tau_w = 500$ msec. |
| erase current | $I_e = 10$ mA/cm$^2$ |
| limit voltage | $V_+ = +2.5V; V_- = -2.5V$ |

The operation characteristics are similar to the above case (A).

(C) CONSTANT VOLTAGE DRIVE

| write-in voltage | $V_w = 2.0V$ |
|---|---|
| write-in period | $\tau_w = 500$ msec. |

| erase voltage | $V_e = 2.0V$ |

The operation characteristics are similar to the above case (A).

When the counter electrode 3 is also coated with the electrochromic layer such as the $WO_3$ film, the counter electrode 3 is colored while the bleaching operation is continuously conducted to a specific segment. This is preferably for the constant potential drive and the constant current drive, because the voltage applied to the counter electrode 3 is reduced when the coloration operation is conducted. Moreover, this is preferable for the constant voltage drive, because the charge amount flowing during the coloration operation is increased.

To test the effect of the present drive system against the photochromism phenomenon, the ECD cell having the 2 mm thick soda lime glass substrate was exposed to the sun beams. When the bleached segment is placed in the bleached memory state as in the case of the conventional drive system, the bleached segment is colored to a contrast ratio 1.3–1.5:1 in one hour. When the constant erasing voltage 2.0 V is continuously applied to the bleached segment, no change is observed on the bleached segment. At this moment, the electric current of about 10 $\mu A/cm^2$ continuously flows through the bleached segment. In addition, when the application of the sun beams is terminated under the condition where the constant erasing voltage 2.0 V is continuously applied to the bleached segment, the electric current flowing through the bleached segment is reduced to about 0.2 $\mu A/cm^2$.

In order to test the effect of the present drive system against the incomplete erasure due to the aging, the ECD cell was driven by million times by a drive cycle of a time interval 2 seconds.

When the drive cycle comprises the write-in period $\tau_w = 500$ msec., the coloration memory period 500 msec., the erase period $\tau_e = 500$ msec. and the erase memory period 500 msec., the electrode is colored to the contrast ratio 1.2:1 even when the electrode is electrically placed in the bleached state.

When the drive cycle comprises the write-in period $\tau_w = 500$ msec., the coloration memory period 500 msec. and the erase period $\tau_e = 1$ sec., that is, when the bleaching operation is continuously conducted till the coloration operation is conducted, the incomplete erasure phenomenon is not detected.

The invention being thus described, it will be obvious that the same may be varied in many ways. Such variations are not to be regarded as a departure from the spirit and scope of the invention, and all such modifications are intended to be included within the scope of the following claims.

What is claimed is:

1. In a drive system for an electrochromic display device which includes an electrochromic material and at least one display electrode, said drive system including coloration means for conducting a coloration operation to said display electrode thereby coloring said display electrode for a predetermined period of time, and bleaching means for conducting a bleaching operation to said display electrode thereby bleaching said display electrode, said drive system further comprising:
holding means for maintaining conduction of said bleaching operation to said display electrode when said display electrode is not being colored, said holding means maintaining conduction of said bleaching operation until the coloration operation is conducted to said display electrode.

2. The drive system of claim 1, wherein said holding means continuously maintains conduction of said bleaching operation to said display electrode until said coloration operation is conducted at said display electrode.

3. The drive system of claim 1, further comprising coloration memory means for placing said display electrode in a memory state for a period of time subsequent to the conduction of the coloration operation at said display electrode and preceding the conduction of the bleaching operation at said display electrode.

4. The drive system of claim 3, wherein said coloration memory means places said display electrode in an electrically opened state.

5. The drive system of claim 1, 2, 3 or 4, wherein said electrochromic display device comprises:
a pair of substrates at least one of which is transparent;
a desired number of transparent display electrodes formed on each of said pair of said transparent substrates;
a $WO_3$ film formed on said display electrodes;
a counter electrode formed on at least one of said pair of substrates; and
a liquid electrolyte filled between said pair of substrates.

6. The drive system of claim 4, wherein a voltage level applied across said liquid electrolyte produces a decomposition of said electrolyte when said voltage level is greater than a certain value and wherein said bleaching means applies a bleaching voltage signal to said display electrode, the level of the bleaching voltage signal being smaller than the said decomposition voltage signal level required to produce a decomposition of said liquid electrolyte.

7. A drive system for an electrochromic display device for energizing said display device with energizing signals indicative of display information, said display device including an electrochromic material and a predetermined number of display segments, different combinations of the display segments defining different desired display patterns, said drive system comprising:
coloration means for conducting a coloration operation to selected ones of said display segments; and
bleaching means for continuously conducting a bleaching operation to the nonselected display segments until said nonselected display segments are selected to receive said coloration operation for displaying a different desired display pattern.

8. The drive system of claim 7, further comprising means for generating a segment control signal indicative of said display information; and
switching means responsive to said segment control signal for selectively connecting said display segments to said coloration means and said bleaching means in response to said segment control signal.

9. The drive system of claim 8, wherein said segment control signal applied to said switching means comprises:
a coloration signal means for connecting selected ones of said display segments to said coloration means for a predetermined period of time;
a coloration memory control signal means responsive to the completion to the energization of said selected ones of said display segments by said coloration means for maintaining said selected ones of said display segments in an electrically opened state; and a bleaching control signal means for continuously connecting the non-selected display segments to said bleaching means until said non-selected display segments are selected for coloration in response to energization by said coloration means.

10. The drive system of claim 7, 8 or 9, wherein said coloration means comprises a first constant voltage source means for applying a predetermined voltage to said display segments, and said bleaching means comprises a second constant voltage source means for applying another predetermined voltage to said display segments.

11. The drive system of claim 7, 8 or 9, wherein said coloration means comprises a first constant current source means for applying a predetermined electric current to said display segments, and said bleaching means comprises a second constant current source means for applying another predetermined electric current to said display segments.

12. The drive system of claim 7, 8 or 9, wherein said coloration means comprises a constant current source means for applying a predetermined current to said display segments, and said bleaching means comprises a constant voltage source means for applying a predetermined electric voltage to said display segments.

13. A drive system for an electrochromic display device which includes an electrochromic material interposed therein and a plurality of display electrodes, said drive system comprising:

coloration means for coloring selected ones of said display electrodes for a predetermined period of time;

means responsive to the lapse of said predetermined period of time for disconnecting said coloration means from said selected ones of said display electrodes thereby maintaining said selected ones of said display electrodes in an electrically open state; and bleaching means responsive to the selection of said selected ones of said display electrodes by said coloration means for continuously bleaching the remaining ones of said display electrodes which are not selected for coloration by said coloration means, said bleaching means continously bleaching the non-selected display electrodes until said non-selected display electrodes are subsequently selected for coloration by said coloration means.

* * * * *